May 1, 1928.
V. A. FYNN
1,668,272
SYNCHRONOUS MOTOR
Filed Aug. 2. 1926
2 Sheets-Sheet 1

Inventor:
VALÈRE ALFRED FYNN,
His Attorney.

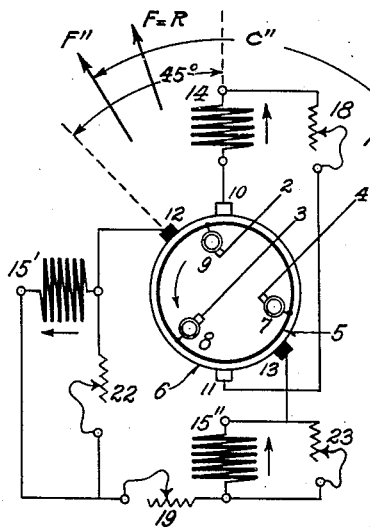
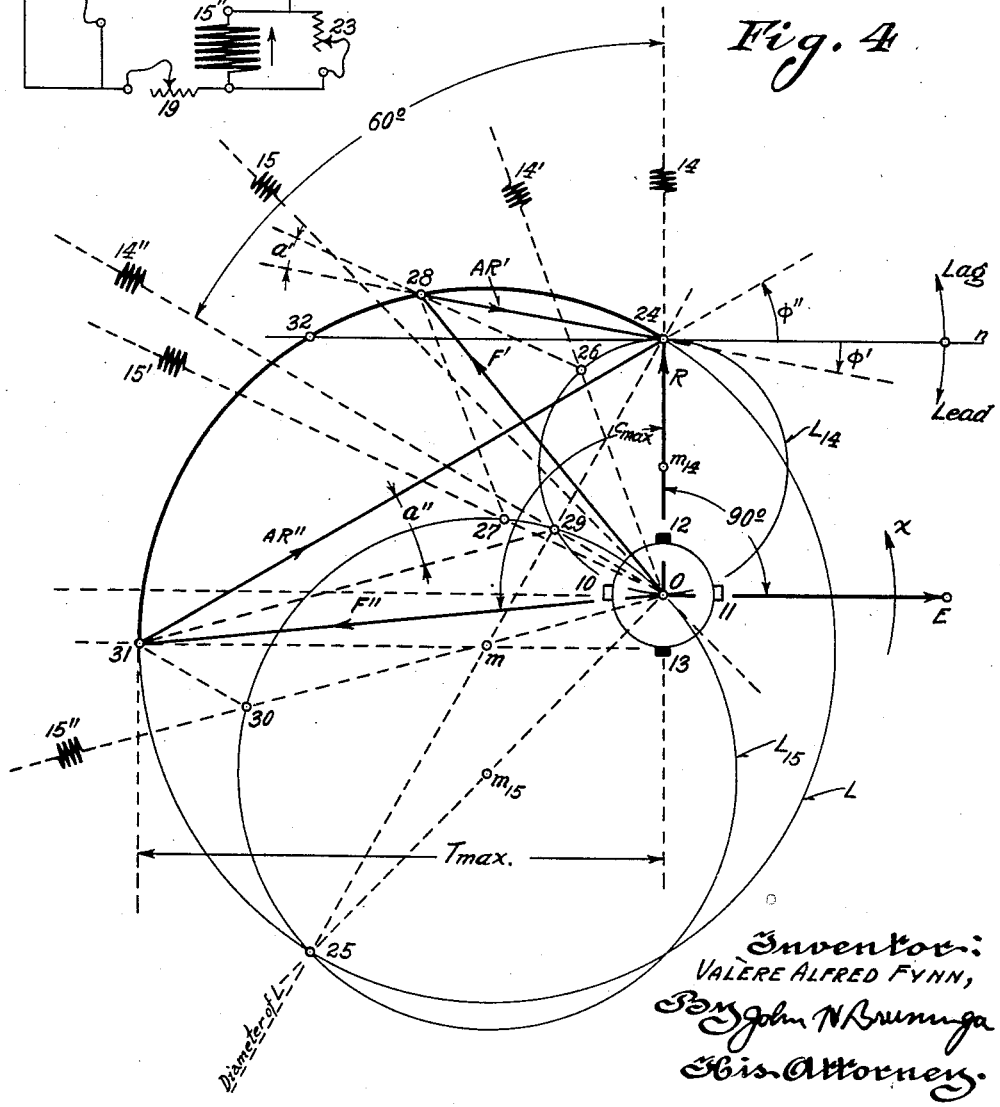

Patented May 1, 1928.

1,668,272

UNITED STATES PATENT OFFICE.

VALÈRE A. FYNN, OF ST. LOUIS, MISSOURI.

SYNCHRONOUS MOTOR.

Application filed August 2, 1926. Serial No. 126,684.

My invention relates to synchronous motors and particularly to polyphase synchronous induction motors, that is, to machines which possess the mechanical features of an asynchronous motor and are adapted to carry variable load at synchronous speed.

The objects and features of this invention will appear from the detailed description taken in connection with the accompanying drawings and will be pointed out in the claims.

Figure 1:
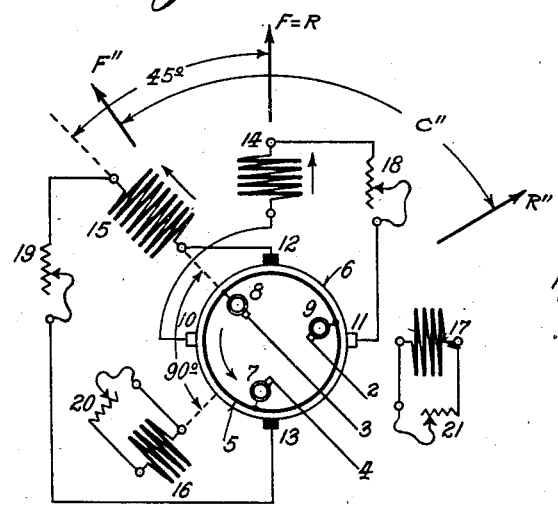
Figure 2:
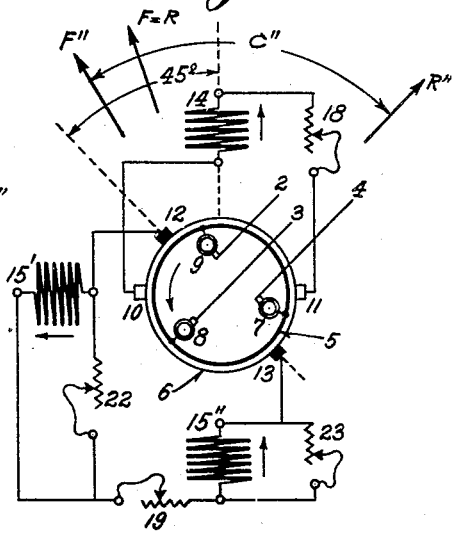
Figure 5:
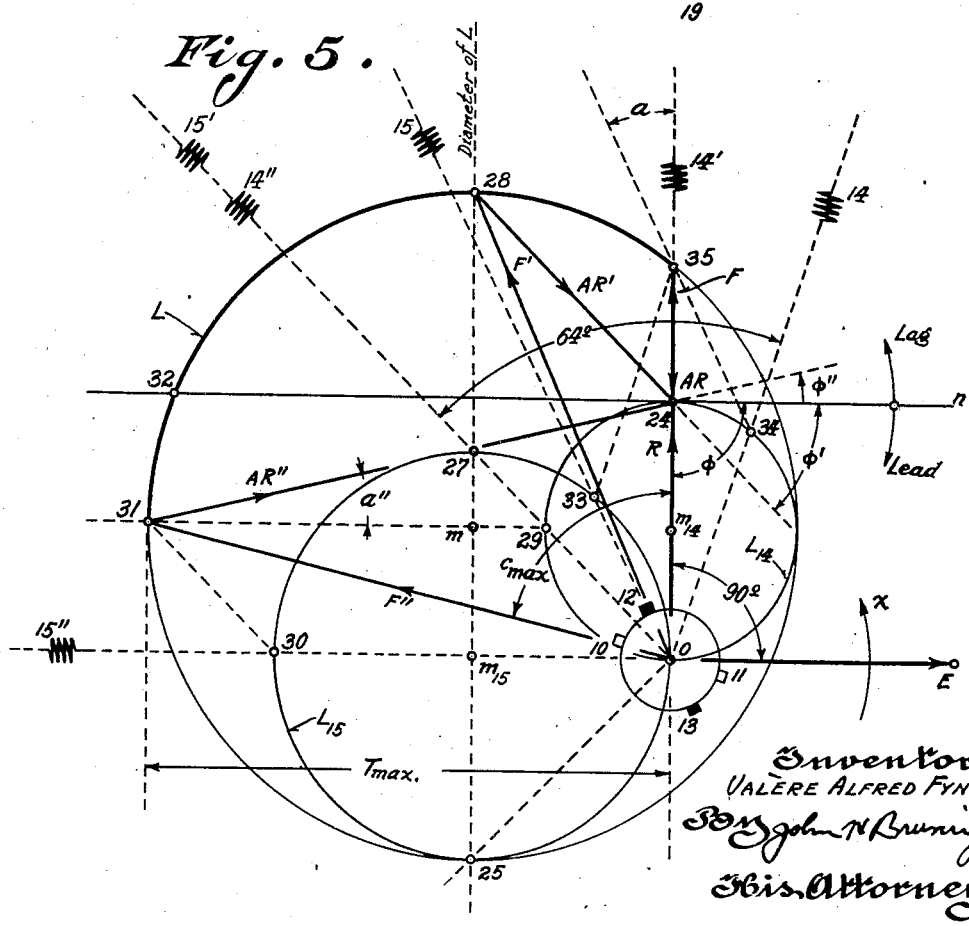

The drawings diagrammatically illustrate three two-pole embodiments of my invention represented by Figures 1, 2 and 3, while Figures 4 and 5 are explanatory diagrams.

Referring to Figure 1, the primary, which is here the revolving member, carries a three-phase winding 5 adapted to be connected to the three-phase supply 2, 3, 4 through the sliprings 7, 8, 9 and brushes cooperating therewith. This primary also carries a commuted winding 6 with which cooperate two sets of stationary brushes 10, 11 and 12, 13 displaced by 90 electrical degrees. The commuted winding is shown as a circle on which the brushes rest. In practice a commutator will be attached to the commuted winding and the brushes will rest on same. The secondary member, here the stator, carries a winding 14 located in the axis of the brushes 12, 13 and therefore displaced by 90 electrical degrees from the axis of the brushes 10, 11 to which it is connected. An adjustable resistance 18 is included in the circuit of the winding 14. Another secondary winding 15 is displaced by 45 electrical degrees from 14 and, therefore, also from the axes of the two sets of brushes. This winding 15 is connected to the brushes 12, 13 with the interposition of the adjustable resistance 19. The secondary also carries the auxiliary windings 16 and 17 adapted to be closed over the adjustable resistances 20 and 21 respectively. The winding 16 is displaced by 90 electrical degrees from the winding 15 and the winding 17 is similarly displaced from the winding 14.

Referring to Figure 2, the primary, here the rotor, carries a three-phase winding 5 adapted to be connected to the three-phase supply 2, 3, 4 through the sliprings 7, 8, 9 and cooperating brushes and also carries a commuted winding 6 with which cooperate two sets of brushes 10, 11 and 12, 13 the axes of which are displaced by 45 electrical degrees. The secondary, here the stator, carries three windings 14, 15' and 15". The windings 14 and 15" are coaxial and displaced by 90 electrical degrees from the winding 15'. The winding 14 is located in an axis substantially perpendicular to the axis of the brushes 10, 11 and is connected to said brushes through the adjustable resistance 18. The windings 15' and 15" are connected in series with each other and with the brushes 12, 13 with the interposition of the adjustable resistance 19. The winding 15' is shunted by the adjustable resistance 22 and the winding 15" is shunted by the adjustable resistance 23. The windings 15' and 15" are so proportioned and located that when the shunts 22 and 23 are interrupted then the current conduced through the windings 15' and 15" by means of the brushes 12, 13, produces magnetizations, for instance directed as indicated by the arrows located alongside of the said windings and combining into a resultant magnetization which is coaxial, or practically so, with the axis of the brushes 12, 13.

Fig. 3 differs from Fig. 2 only in that the brushes 10, 11 are coaxial with the winding 14 to which they are connected instead of being displaced by 90 electrical degrees from 14.

Turning now to the operation of Figures 1, 2 and 3, and referring particularly to Figure 1, the windings and brushes are so constituted, dimensioned and located that the machine can be started with a powerful torque as an induction motor, made to develop a sufficient synchronizing torque to bring the machine into synchronism under load and thereafter caused to operate with a load-power-factor-characteristic, satisfactory for most practical purposes.

According to one way of operating the motor of Fig. 1, the circuits of the windings 14 and 15 may be interrupted at the movable contacts or switches 18 and 19. When the sliprings are connected to the three-phase supply a primary flux is set up in the machine, which according to the connections may revolve in the one or the other direction. Assuming that this flux revolves clockwise, then the primary member will revolve counterclockwise and this revolution will be brought about by the interaction of the primary flux with the ampereturns generated by said flux in the windings 16, 17, which ampereturns can be regulated in a well understood manner by means of the adjustable resistances 20 and 21. In this wise, the motor can be brought near to synchronism. In order to synchronize the machine the circuits of the windings 14 and 15 are closed and the resistances 18, 19 reduced to the desired extent. Near synchronism the voltages generated by the primary flux in the windings 14, 15, 16, 17 are very small whereas the magnitude of the brush voltages, to which I may also refer as the auxiliary voltages, is independent of the speed of the primary and only depends on the magnitude of the primary flux, as is now well understood. Near synchronism these voltages send conduced currents through the windings 14, 15 and these conduced ampereturns react with the primary flux to produce a synchronizing torque below synchronism and the synchronous torque in synchronous operation. Seeing that the primary revolves counterclockwise it is clear that the auxiliary voltage at the brushes 10, 11 leads by 90 degrees the voltage generated in the winding 14 by the primary flux. Similarly the auxiliary voltage at the brushes 12, 13 lags 45 degrees behind the voltage generated by the primary flux in the secondary winding 15. Under these conditions the secondary winding 14 is responsible for a synchronizing torque of double slip frequency and the winding 15 is responsible for a substantially unidirectional synchronizing torque having one strictly unidirectional and pulsating component and having another double slip frequency alternating component. The resultant synchronizing torque produced by the secondary winding 15 is an alternating torque with very unequal positive and negative maxima, the amplitude of the negative maxima being about 18% of the amplitude of the positive maxima and any positive impulse lasting three times as long as any negative one. The total synchronizing torque is, of course, the vectorial sum of the synchronizing torques produced by the windings 14 and 15. Since the winding 15 produces the more desirable synchronizing torque then, from this point of view, it is better to so dimension the windings 14 and 15 that the latter will produce more conduced ampereturns than the former. The operating characteristic of the machine as a synchronous motor also depends on the ratio of the conduced ampereturns in the windings 14 and 15. The diagram of Figure 4 gives considerable information in this connection and will be discussed later. Upon the demand of a torque in excess of the maximum synchronous torque the motor lapses into asynchronous operation and the windings 16 and 17, which are idle at synchronism, become active at sub-synchronous speed and produce a uniform or practically uniform induction motor torque in conjunction with the secondary windings 14 and 15.

The machine can also be started with the circuits of the windings 14 and 15 closed through their respective brush sets and the commuted winding 6. When so starting, the secondary windings 15 and 16 cooperate to produce one two-phase induction motor torque and the windings 14, 17 cooperate to produce another two-phase induction motor torque displaced from the first. The resultant induction motor torque is the vectorial sum of the two two-phase torques. Under these conditions it is not necessary to rearrange the circuits when synchronism is approached, but it may be necessary or desirable to manipulate the resistances in some or in all of the several circuits in a manner now well understood.

Another way of starting this motor is to utilize the windings 15 and 16 connected in the manner shown in the figure, eliminating the winding 17, and closing the circuit of the winding 14, or not, as desired. If the winding 14 is left open at starting then it should be closed before the machine has synchronized or after it is operating synchronously.

The windings 16 and 17, or one of them, can be permanently closed each circuit being given any desired resistance.

At synchronism the machine shown in Figure 1 operates somewhat as follows: Assuming that the resistance 18 is so adjusted that with the unidirectional auxiliary voltage available at synchronism at the brushes 10, 11 the winding 14 produces a secondary magnetization F which is just equal to the resultant magnetization R of the motor as determined by the terminal voltage of the machine, then for zero torque the resultant R coincides with F and both are coaxial with 14. Under these conditions the auxiliary voltage at the brushes 12, 13 is zero and the winding 15 produces no ampereturns. Upon the demand of a positive torque, be it for no-load operation or for operation at some given load, the resultant R moves clockwise in the direction of rotation of the primary flux with respect to the primary, a unidirectional voltage appears at the brushes 12, 13 causing the winding 15 to produce conduced ampereturns on the secondary directed as indicated by the arrow placed alongside of 14. The resultant secondary and unidirectional magnetization F now moves counterclockwise. The angular displacement $c$ between F and R increases with load and maximum synchronous torque is secured for a value of $c$ such, for instance as $c''$, which value depends on the constants of the machine, particularly on the ratio of the maximum conduced ampereturns in 14 to the maximum conduced ampereturns in 15, on the angular displacement of the secondary windings 14, 15, and on the position of the brush axes relatively to the axes of the secondary windings to which they are connected. A possible position of the resultant R for maximum synchronous torque is indicated in Figure 1 by the arrow R" and the corresponding possible position of F is indicated by F". The magnetizations produced by the windings 14 and 15 of Fig. 1 are said to be displaced by 45 electrical degrees, or by less than 90 electrical degrees, say at synchronism, when they are directed as shown by the arrows placed next to the windings producing them. If the conduced unidirectional current in one of the windings 14 or 15 of Fig. 1 is reversed while that in the other is not, then the magnetizations these windings produce become displaced by 135 electrical degrees instead of 45, or generally by more than 90 electrical degrees.

Referring to Figure 2, it differs from Figure 1 in that the winding 15 is divided into two groups or windings connected in series and displaced by 90 electrical degrees, also in that the brushes 12, 13 are displaced from the axis of the secondary 14 by 45 electrical degrees in the direction of rotation of the primary or against the direction of rotation of the primary flux with respect to the primary. The component windings 15' and 15" are so connected and dimensioned that the resultant magnetization which they produce substantially coincides with the axis of the brushes 12, 13. Assuming that the shunts around the windings 15' and 15" are interrupted at 22 and 23, then the machine can be started by connecting the sliprings to the supply and leaving both secondary windings connected to their respective brush sets. Under these conditions induction motor torque producing ampereturns are generated in the windings 14, 15 by the primary flux at starting and close through the commuted winding 6; but the windings 14 and 15 produce secondary magnetizations which are displaced by 45 electrical degrees with the result that the induction motor torque varies in magnitude during each revolution, the locus for said torque vector being an ellipse instead of a circle. Whenever a heavy starting torque is not required the machines shown in Figs. 1 or 2 can be started as just described, but when the starting conditions are more severe a more uniform induction motor torque is necessary. In Figure 1 this has been achieved by the addition of one or two secondary windings such as 16 and 17 closed preferably, but not necessarily, through an adjustable resistance. Similar results can be achieved in Figure 2 without the use of additional windings on the secondary.

Another way of starting the motor shown in Figure 2 is to interrupt the circuit of the brushes 12, 13 at the adjustable resistance 19, and shunt the winding 15' by means of the resistance 22 and the winding 15" by means of the resistance 23. This immediately provides a two-phase secondary, one phase of which is 15' and the other 15". If the primary is now connected to the supply a uniform induction motor torque is produced and the machine is readily brought to near synchronism with the circuit of the winding 14 closed, or not, as desired. When the machine has reached a sufficient speed the circuit of the brushes 12, 13 is closed at 19 and that of the winding 14, if not already closed, is closed at 18. Thereupon the resistance of the shunts to the windings 15' and 15" is increased to a predetermined finite value or the shunts are interrupted. The resistance of these shunts may also be given a permanent and constant value. So soon as the windings 15' and 15" carry about equal conduced ampereturns they produce a secondary magnetization coaxial with the brushes 12, 13 and this magnetization in cooperation with the primary flux produces a strictly unidirectional synchronizing torque to which may be added the double slip frequency alternating synchronizing torque produced by the winding 14. In Figure 2 the auxiliary voltage at the brushes 10, 11 leads the voltage generated in 14 by the primary flux, by 90 electrical degrees, whereas the auxiliary voltage at the brushes 12, 13 is cophasal and codirectional with the vectorial sum of the voltages generated by the primary flux in the secondary windings 15' and 15". In other words, in so far as the secondary winding 14 is concerned, the auxiliary voltage impressed thereon reaches a maximum when the axis of the primary flux coincides with the axis of 14. With regard to the winding 15' plus 15" or with regard to the axis of the resultant magnetization produced by the component and series connected secondary windings 15' and 15" the auxiliary voltage 12, 13 reaches a maximum when the primary flux is displaced by 90 electrical degrees, or thereabouts, from the axis of the resultant conduced ampereturns produced by 15' and 15".

In Figures 1, 2 and 3 the windings 14 and 15 connected to the two sets of brushes, or more broadly, to the two auxiliary voltages, are displaced by 45 electrical degrees. I have elsewhere shown what can be achieved when secondary windings of this description are displaced by 90 electrical degrees and this application is directed to machines in which two secondary windings are displaced by an angle other than 90, and more particularly by an angle less than 90 electrical degrees. While the angle of 45 degrees illustrated in the figures is a useful and convenient one, it is by no means the only possible angle of displacement other than 90 degrees.

In so far as synchronizing ability is concerned, the strictly unidirectional synchronizing torque is the most effective but a moderate departure from strict unidirectionality does not materially interfere with the synchronizing ability. A strictly unidirectional synchronizing torque is secured when the brushes are so located with respect to the winding to which they are connected that the auxiliary or brush voltage is cophasal with the voltage concurrently generated in the winding by the primary flux. Mechanically expressed, this occurs when the brush axis coincides with the axis of the secondary winding to which said brushes are connected and when the connections between brushes and winding are made accordingly and as shown. The greater the angle of displacement between these axes the less desirable the synchronizing torque. From this point of view the arrangement shown in Figure 2 is to be preferred to that shown in Figure 1.

The motor shown in Fig. 3 can be operated like that shown in Fig. 2 or in the following manner: Seeing that the brushes 10, 11 are coaxial with the secondary 14, or practically so, and are so connected that, near synchronism, the voltage at the brushes 10, 11 is of same phase and direction as the voltage concurrently generated in 14 by the primary flux, the synchronizing torque due to 14 will be strictly unidirectional and pulsating, or nearly so. To start the motor the circuit of the brushes 12, 13 can be interrupted at 19 and the windings 15' and 15" shunted by the resistances 22, 23. At starting or at any sub-synchronous speed the circuit of 14 can be closed and the resistance 18 adjusted with synchronization in view. Because of the relation between the axis of 14 and that of the brushes 10, 11, the winding 14 will synchronize the motor under most ordinary conditions and the circuit of the brushes 12, 13 can be closed at 19 and the shunts 22, 23 modified or removed after synchronization. If a greater synchronizing torque is required then the circuit of the brushes 12, 13 must be reorganized before synchronism is reached.

In so far as the synchronous operating characteristic is concerned that is also affected by the relative position of the axes of the windings and of the brushes or by the sub-synchronous phase relation of the auxiliary voltages to the voltages concurrently generated in the secondary windings by the primary flux. In addition this characteristic also depends on the relation between the maximum ampereturns in one of the secondary windings, say 14, to the maximum ampereturns in the other secondary winding, say 15. To make it easily possible for the user or builder of such machines to adapt them to his requirements the explanatory diagrams in Figures 4 and 5 are added.

Referring to Figure 4 which is a circle diagram corresponding to the conditions as depicted in Figure 1, let it be assumed that the primary impedance is negligible and that in consequence the resultant motor magnetization R lags just 90 degrees behind the terminal voltage E and let these two values be represented in Figure 4 by the vectors O—24 and O—E respectively. Bearing in mind that any brush voltage depends on the magnitude of the resultant magnetization R and on the space location of R with respect to the brush axis in question, it is possible to at once determine the relative positions of the brush axes and of R for which the ampereturns in the winding 14 and in the winding 15 are a maximum. For the connections shown in Figure 1 and for a counterclockwise rotation of the primary the resultant motor magnetization R must revolve clockwise with increasing load. Exactly the same results must obviously be secured if the system of brushes and connected windings is displaced counterclockwise without disturbing the relative positions of the several elements of this system. This procedure has been followed in Figures 4 and 5 as the more convenient and in these figures R and E are supposed to be stationary and brushes and windings are supposed to be rotated counterclockwise as indicated by the curved arrow $x$. When R coincides with the axis of 14 then the auxiliary voltage 10, 11 is at a maximum. Let this voltage be such that the magnetization then produced by 14 is equal to R. Under these conditions the vector O—24 represents a diameter of a circle $L_{14}$ drawn about the center $m_{14}$ of O—24 and $L_{14}$ is the locus for the value of the magnetization produced by 14 for any position of R with respect to the axis of the brushes 10, 11. When R coincides with the axis of 14 the auxiliary voltage at the brushes 12, 13 is obviously zero and so are the ampereturns in 15, but when the brushes 12, 13 have been turned through 90 electrical degrees in a counterclockwise direction then the voltage at said brushes becomes a maximum and the ampereturns produced by 15 are also a maximum. But, when the axis of 12, 13 is perpendicular to R then the axis of 15 is displaced from R by 135 degrees as indicated by the vector O—25. In Figure 4 it has been assumed that the maximum ampereturns produced by 15 are twice as great as the maximum ampereturns produced by 14 and the vector O—25 is shown accordingly. This vector is a diameter of the circle $L_{15}$ which is the locus for the values of the ampereturns in 15 for every position of R relatively to the axis of the brushes 10, 11. The line 24—25 joining the maxima of 14 and 15, as obtained through a displacement of R through 90 degrees, is a diameter of the circle L which is the locus for the resultant of the ampereturns in 14 and 15 for any position of R relatively to the two brush axes.

The brushes 10, 11 and 12, 13 in Figure 4 are shown in that relative position with respect to R which corresponds to zero torque. The maximum synchronous torque is obtained when the vectorial sum F of the ampereturns in 14 and 15 reaches the point 31, because the torque is measured by the projection of F on a perpendicular to R. For this maximum useful value of F which is designated by F'' the winding 14 contributes ampereturns measured by the vector O—29 and the winding 15 contributes ampereturns measured by the vector O—30. To make matters more clear the corresponding locations of 14 and 15 are indicated at 14'' and 15'' in their correct relative location with respect to R. For the intermediate value F' the component ampereturns contributed by 14 and 15 are measured by the vectors O—26 and O—27 respectively. Since R is always the resultant of the vectorial sum of F and the primary armature reaction ampereturns AR the latter can immediately be found as to magnitude and phase when F and R are known. For the value F'' of F the primary ampereturns are AR'' and lag by $\phi''$ degrees behind E. This lag is indicated as against the line $n$ drawn parallel to E through the end of the vector R. For the intermediate value F' the armature ampereturns are AR' and lead E by $\phi'$ degrees. For zero torque the primary ampereturns are nil and F equals R for the conditions chosen as the basis of Figure 4. The useful portion of the circle L which is the locus for F is indicated by a heavier line. It extends from point 31 through points 32 and 28 to point 24. It will be noted that the ampereturns supplied by the winding 15 are always considerably smaller than the corresponding armature ampereturns and, furthermore, that they are axially displaced from same. Thus, when the primary reaction is AR'' the ampereturns supplied by 15 are measured by O—30 which equals 29—31 and are displaced by $a''$ degrees from AR''. Similarly, when the primary reaction is AR' the ampereturns contributed by 15 are measured by O—27 equal to 26—28 displaced by $a'$ degrees from AR'.

Turning to Figure 5, which is based on the arrangement of brushes and windings shown in Figure 2, and assuming that the maximum ampereturns in 14 equal R and are to the maximum resultant ampereturns due to 15' and 15'' as 5 to 8, the circle diagram for Fig. 2 can be as readily constructed as that for Figure 1. For this construction the windings 15' and 15'' are considered as a single resultant winding 15 located in the axis of the brushes 12, 13 which is obviously an equivalent arrangement in so far as secondary unidirectional magnetization is concerned. When R coincides with 14 the ampereturns in 14 are a maximum and the vector O—24 is a diameter of the locus $L_{14}$, a circle about the center $m_{14}$ of O—24. When the brushes 12, 13 are at right angles to R then the ampereturns in 15, or the vectorial sum of the ampereturns in 15' and 15'', are a maximum, and since the axis of 15 here coincides with that of 12, 13, then the vector O—30 is a diameter of the locus $L_{15}$ drawn about the center $m_{15}$. When R, or its axis, coincides with the axis of 14, the winding 14 contributes ampereturns measured by the vector O—24 and the winding 15 contributes ampereturns measured by the vector O—27. The sum of these vectors is O—28 and 28 is one end of a diameter of the circle L which is the locus for the vectorial sum of the ampereturns in 14 and 15 for any position of R with respect to the brush axes in Figure 2. To find the other end of this diameter the brushes and windings are moved through 90 electrical degrees in a counterclockwise direction which brings the axis of 10, 11 to coincide with R, thus making the ampereturns in 14 zero. At the same time the axis of 15 stands displaced by 135 degrees from R and the vector O—25 measures not only the ampereturns in 15 but the total secondary magnetization existing at that time. The point 25 is the other end of a diameter of L. The circle L can now be drawn about the center $m$ of the line 28—25. It is here to be noted that when R coincides with 14 in Figure 2 the torque is not zero but becomes zero when R moves away from the axis of 14 in the direction of the axis of the brushes 12, 13. In other words, when the system of brushes and windings is displaced clockwise from the position in which it is shown in Figure 2. The zero torque position of the brushes and windings of Figure 2 with respect to R is indicated in Figure 5. At that time the winding 14 is in the position there shown by 14 and contributes ampereturns measured by the vector O—34. Concurrently, the winding 15 occupies the position shown by 15 and contributes ampereturns measured by the vector O—33. The vectorial sum of the contributions of 14 and 15 is measured by the vector O—35. For zero torque the primary ampereturns AR are measured by the line 35—24, are opposed in direction to R and lead E by $\phi = 90$ degrees. The useful portion of the locus L is again shown by a heavy line. In this case it is to be noted that the ampereturns produced by the winding 15 exactly equal and oppose the armature reaction ampereturns at the time when R coincides with the axis of 14. For all positions of R corresponding to greater loads the ampereturns produced by 15 are less than the corresponding armature reaction ampereturns and are displaced from same as indicated by the angle $a''$. For positions corresponding to smaller motor loads the ampereturns produced by 15 exceed the corresponding armature reaction ampereturns and are displaced from same as for instance by the angle $a$. If the primary impedance is taken into account, and this impedance varies continuously with varying load in the type of machine here disclosed, then the phase angle $\phi$ is modified but all else remains as shown. When the windings 14 and 15 are displaced by 90 electrical degrees then neither winding can ever produce ampereturns which equal and oppose the armature reaction ampereturns no matter how the two brush sets are displaced from each other or from the secondary windings to which they are connected.

In synchronous operation of the motor shown in Fig. 3 the windings 15' and 15'' are connected in series with each other and with the brushes 12, 13 and produce a unidirectional magnetization which is practically coaxial with the axis of the brushes 12, 13. Similarly the magnetization produced by 14 is strictly or nearly coaxial with the axis of the brushes 10, 11. If the secondary magnetizations were displaced by 90 electrical degrees and connected to coaxially located brushes in the manner shown in Fig. 3 the machine could not operate synchronously at a plurality of loads unless the two magnetizations differed in magnitude. When the secondary magnetizations are displaced by an angle other than 90, as in Fig. 3, and connected to coaxial brushes in the manner shown then the machine will operate synchronously at a plurality of loads even if the two unidirectional magnetizations are equal. This can be readily shown by means of a circle diagram such as those in Figures 4 and 5.

Whether the primary revolves or is stationary is immaterial in so far as the principle of operation is concerned, but a change to a stationary primary, of course, involves well understood structural modifications. Furthermore, it is immaterial whether the auxiliary voltages are derived from the machine itself or from some outside source, provided said voltages are always of slip frequency and provided their magnitude is independent of said frequency.

While theories have been advanced as to operation of the machines and methods here described, this has been done with a view to facilitating the description thereof, and it is to be understood that I do not bind myself to these or any other theories.

It will be clear that various changes may be made in this disclosure without departing from the spirit of this invention, and it is, therefore, to be understood that this invention is not to be limited to the specific details here shown and described.

What I claim is:

1. A motor which carries variable load at synchronous speed, having a primary and a secondary, means on the secondary adapted to magnetize the secondary along one axis, other means on the secondary adapted to magnetize said secondary along an axis displaced from the first by an angle other than 90 electrical degrees, a commuted winding on the primary, two sets of brushes located along displaced axes and cooperating with the commuted winding, one set of brushes being connected to one of the magnetizing means on the secondary and the other set to the other magnetizing means on the secondary, the axis of one brush set being displaced by about 90 electrical degrees from the axis of the secondary magnetization produced by the magnetizing means to which it is connected.

2. A motor which carries variable load at synchronous speed, having a primary and a secondary, means for producing a primary flux which revolves with respect to the primary, means on the secondary adapted to magnetize the secondary along one axis, other means on the secondary adapted to magnetize said secondary along an axis displaced from the first by an angle other than 90 electrical degrees, a commuted winding on the primary, two sets of brushes located along displaced axes and cooperating with the commuted winding, one set of brushes being connected to one magnetizing means on the secondary and the other set to the other magnetizing means on the secondary, the axis of one set of brushes being displaced by about 90 electrical degrees from the axis of one of the secondary magnetizations and so connected to the means producing said magnetization that the brush voltage leads the voltage concurrently generated in said means by the primary flux, and the axis of the other set of brushes being displaced from the perpendicular to the axis of the other secondary magnetization.

3. A motor which carries variable load at synchronous speed, having a primary and a secondary, means for producing a primary flux which revolves with respect to the primary, means on the secondary adapted to magnetize the secondary along one axis, second means on the secondary adapted to magnetize said secondary along an axis displaced from the first by an angle less than 90 electrical degrees, a source of two auxiliary voltages which are of different phase and of slip frequency at sub-synchronous speeds, of a magnitude independent of their frequency, and which become unidirectional at synchronism, means for so impressing one auxiliary voltage on the first means for producing a secondary magnetization that the auxiliary voltage leads by a substantial angle the voltage concurrently generated by the primary flux in the said first magnetization producing means, and means for so impressing the other auxiliary voltage on the second means for producing a secondary magnetization that at least a component of this other auxiliary voltage is cophasal and codirectional with the voltage concurrently generated by the primary flux in said second magnetization producing means.

4. A motor which carries variable load at synchronous speed, having a primary and a secondary, means on the secondary adapted to magnetize said secondary along one axis, second means on the secondary adapted to magnetize said secondary along an axis displaced from the first by an angle other than 90 degrees, a source of two auxiliary and unidirectional voltages both of which vary in magnitude but retain the same direction when the load on the synchronously operating motor varies, means for impressing one auxiliary voltage on the first magnetizing means on the secondary, and means for impressing the other auxiliary voltage on the second magnetizing means on the secondary.

5. A motor which carries variable load at synchronous speed, having a primary and a secondary, three windings on the secondary, two of these windings being coaxial and the other being displaced therefrom, a commuted winding on the primary, two sets of brushes located along displaced axes and cooperating with the commuted winding, one set of brushes being connected to one of the coaxial windings and the other set of brushes being connected in series with the second coaxial and with the displaced winding to produce by the brush current conduced into the series connected windings a secondary magnetization displaced by less than 90 electrical degrees from the secondary magnetization produced by brush current conduced into the first coaxial winding.

6. A motor which carries variable load at synchronous speed, having a primary and a secondary, three windings on the secondary, two of these windings being coaxial and the other being displaced by about 90 electrical degrees therefrom, a commuted winding on the primary, two sets of brushes located along displaced axes and cooperating with the commuted winding, one set of brushes being connected to one of the coaxial windings and displaced from the axis thereof by about 90 electrical degrees, the other set of brushes being connected in series with the second coaxial and with the displaced winding and displaced from the perpendicular to the axis of the resultant magnetization produced by the brush currents conduced into the series connected windings, and means for shunting the displaced winding on the secondary.

7. A motor which carries variable load at synchronous speed, having a primary and a secondary, three windings on the secondary, two of these windings being coaxial and the other being displaced by about 90 electrical degrees therefrom, a commuted winding on the primary, two sets of brushes located along displaced axes and cooperating with the commuted winding, one set of brushes being connected to one of the coaxial windings and the other set of brushes being connected in series with the second coaxial and with the displaced winding to produce by the brush current conduced into the series connected windings a secondary magnetization displaced by less than 90 electrical degrees from the secondary magnetization produced by brush current conduced into the first coaxial winding, circuit controlling means located between the series connected windings on the secondary, and means for shunting one of the series connected windings on the secondary.

8. A motor which carries variable load at synchronous speed, having a primary and a secondary, three windings on the secondary, two of these windings being coaxial and the other being displaced by about 90 electrical degrees therefrom, a commuted winding on the primary, two sets of brushes located along displaced axes and cooperating with the commuted winding, one set of brushes being connected to one of the coaxial windings and displaced from the axis thereof, the other set of brushes being connected in series with the second coaxial and with the displaced winding and displaced from the perpendicular to the axis of the resultant magnetization produced by the brush currents conduced into the series connected windings, and means for shunting each of the series connected windings on the secondary.

9. A motor which carries variable load at synchronous speed, having a primary and a secondary, means on the secondary adapted to magnetize said secondary at synchronism along one axis, second means on the secondary adapted to magnetize said secondary at synchronism along an axis displaced from the first by an angle other than 90 electrical degrees, a commuted winding on the primary, two sets of brushes located along displaced axes and cooperating with the commuted winding, one set of brushes being connected to the first magnetizing means on the secondary and the other set of brushes being connected to the second magnetizing means on the secondary, and means for securing at sub-synchronous speeds an induction motor torque of substantially constant magnitude.

10. The method of operating a motor which carries variable load at synchronous speed, comprising, producing a substantially uniform induction motor torque at starting by means of displaced windings located on the secondary, impressing an auxiliary slip frequency voltage the magnitude of which is independent of its frequency and which becomes unidirectional at synchronism on a secondary winding to produce a synchronizing torque and a unidirectional magnetization at synchronism, producing at synchronism a second unidirectional magnetization displaced from the first by less than 90 electrical degrees, and causing these two unidirectional magnetizations to so vary with varying load as to produce a resultant unidirectional magnetization which increases with increasing load.

In testimony whereof I affix my signature this 30th day of July, 1926.

VALÈRE A. FYNN.